US007240243B2

(12) United States Patent
Decker (10) Patent No.: US 7,240,243 B2
(45) Date of Patent: Jul. 3, 2007

(54) SYSTEM AND METHOD FOR FACILITATING PROGRAMMABLE COVERAGE DOMAINS FOR A TESTCASE GENERATOR

(75) Inventor: Mark H. Decker, Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 1183 days.

(21) Appl. No.: 10/113,319

(22) Filed: Mar. 28, 2002

(65) Prior Publication Data
US 2003/0188224 A1    Oct. 2, 2003

(51) Int. Cl.
G06F 11/00    (2006.01)
(52) U.S. Cl. .............................. 714/33; 714/32; 714/37; 714/41; 714/741; 717/143
(58) Field of Classification Search .................. 714/32, 714/33, 37, 41, 741; 717/143
See application file for complete search history.

(56) References Cited

U.S. PATENT DOCUMENTS

| 5,050,168 | A |   | 9/1991  | Paterson ....................... 371/19     |
| 5,265,254 | A |   | 11/1993 | Blasciak et al. ............ 395/700        |
| 5,604,895 | A |   | 2/1997  | Raimi ......................... 395/500     |
| 5,651,111 | A |   | 7/1997  | McKeeman et al. ... 395/183.14              |
| 5,758,061 | A |   | 5/1998  | Plum ....................... 395/183.11     |
| 5,913,023 | A | * | 6/1999  | Szermer ....................... 714/38      |
| 5,974,248 | A |   | 10/1999 | Graef .................... 395/500.43       |

(Continued)

FOREIGN PATENT DOCUMENTS

JP    2058136 A    2/1990

(Continued)

OTHER PUBLICATIONS

A.K. Chandra, V.S. Iyengar, R.V. Jawalekar, M.P. Mullen, I.Nair, and B.K. Rosen, "Architectural Verification of Processors Using Symbolic Instruction Graphs," 1994, pp. 454-459.

(Continued)

Primary Examiner—Robert W Beausoliel
Assistant Examiner—Charles Ehne
(74) Attorney, Agent, or Firm—Cantor Colburn LLP (57) ABSTRACT

The invention relates to a system and method for facilitating programmable coverage domains for test case generation, feedback, and measurement. The system comprises a domain definition input file; user-defined coverage domain data entered into the domain definition input file; and a parser operable for translating the user-defined coverage domain data into machine-readable computer program code. The system further includes an internal coverage domain comprising: a union of enabled coverage domains extracted from the user-defined coverage domain data; a session component comprising a session update count for each domain element; and a history component comprising a history update count for each domain element. The system further comprises a testcase generator including an internal coverage feedback and measurement system. The testcase generator comprises an instruction generator operable for generating instructions for use in a testcase and an instruction simulator operable for simulating execution of the instructions. The testcase generator accesses information in the internal coverage domain via the internal coverage feedback and measurement system, generates testcases for a current generation session, and updates the internal coverage domain according to the results of the testcase execution. The invention also comprises a method and storage medium.

24 Claims, 5 Drawing Sheets

U.S. PATENT DOCUMENTS

| | | | | |
|---|---|---|---|---|
| 6,041,330 | A | * | 3/2000 | Carman et al. ............. 707/101 |
| 6,092,147 | A | | 7/2000 | Levy et al. .................... 711/6 |
| 6,148,427 | A | * | 11/2000 | Sherwood et al. .......... 714/738 |
| 6,219,802 | B1 | * | 4/2001 | Beeker et al. ................ 714/32 |
| 6,249,886 | B1 | | 6/2001 | Kalkunte ..................... 714/47 |
| 6,647,513 | B1 | * | 11/2003 | Hekmatpour ................ 714/37 |

FOREIGN PATENT DOCUMENTS

| | | |
|---|---|---|
| JP | 03271949 | 12/1991 |
| JP | 6161825 A | 6/1994 |

OTHER PUBLICATIONS

A. Chandra, V. Iyengar, D. Jameson, R. Jawalekar, I. Nair, B. Rosen, M. Mullen, J. Yoon, R. Armoni, D. Geist and Y. Wolfsthal AVPGEN—A Test Generator for Architecture Verification, IEEE Transactions on Very Large Scale Integration Systems, vol. 3. No. 2, Jun. 1995 pp. 188-200.

C. Young, N. Gloy, M.D. Smith "A Comparative Analysis of Schemes for Correlated Branch Prediction," Proceedings of the 22nd Annual International Symposium on Computer Architecture, Jun. 1995, pp. 1-11.

R. Zhang, W. King, M. Guo, "A Hybrid Branch Prediction Scheme: An Integration of Software and Hardware Techniques", Proceedings of MASPLAS '01, Apr. 27, 2001, pp. 2.1-2.8.

Z. Su and M. Zhou, A Comparative Analysis of Branch Prediction Schemes Feb. 4, 2002 pp. 1-22.

* cited by examiner

FIG. 1

ENABLE MNEM(LTR) ARCH(S390) LEVEL(Host) XLAT(Real) AMODE(31) TYPE(CCs)

FIG. 2A

ENABLE MNEM(L) ARCH(S390) LEVEL(Host) XLAT(Primary, Secondary) AMODE(31) TYPE(EXCEPTIONS(PageTrans, SegTrans))

FIG. 2B

ENABLE IFETCH ARCH(S390) LEVEL(Host) XLAT(Real,AR) AMODE(31) TYPE(EXCEPTIONS)

FIG. 2C

ENABLE MNEM(BSA) ARCH(ESAME) XLAT(PRIMARY) AMODE(31) LEVEL(HOST) BRANCH(TAKEN, NOTTAKEN)TYPE(EXCEPTIONS)

FIG. 2D

ENABLE SEQ(0)
ARCH(ESAME) LEVEL(Host) XLAT(Real) AMODE(64) MNEM(AR,SR) TYPE(CCs(0))
ENABLE SEQ(1)
MNEM(S,A) TYPE(CCs(0))
ENABLE SEQ(2)
MNEM(CLR,CL) TYPE(CCs(0)) ENDSEQ

FIG. 2E

```
csp2:sig
{ n1: CoverageSelected_Op n2 with Coverage(UncoveredSession),
    MachineStateCoverageSelect,NoIFetchException;
    end
n2: SVC;
    end
};

start csp2.n1;
```

SYSTEM AND METHOD FOR FACILITATING PROGRAMMABLE COVERAGE DOMAINS FOR A TESTCASE GENERATOR

CROSS REFERENCE TO RELATED APPLICATIONS

This application is related to co-pending applications Ser. No. 10/113,756 entitled "System and Method for Verifying Superscalar Computer Architectures", and "System and Method for Facilitating Coverage Feedback Testcase Generation Reproducibility", Ser. No. 10/109,502 which were both filed on Mar. 28, 2002 and are incorporated herein by reference in their entireties.

FIELD OF THE INVENTION

This invention relates generally to integrated circuit testing and, more specifically, the invention relates to a method and system for facilitating programmable coverage domains for a testcase generator.

BACKGROUND OF THE INVENTION

The proliferation of modern electronics into our everyday lives is due in large part to the existence, functionality and relatively low cost of advanced integrated circuits. As technology moves ahead, the sophistication of integrated circuits increases. An important aspect of designing an advanced integrated circuit is the ability to thoroughly test the design of the integrated circuit to assure the design complies with desired architectural, performance, and design parameters. Testing a complex integrated circuit such as a superscalar microprocessor requires the generation of a large number of instruction sequences to assure that the microprocessor behaves properly under a wide variety of circumstances.

Verification techniques generally require automated testing systems that can turn out high volume testcases in an effort to sufficiently cover the realm of possible behaviors of the integrated circuit being tested. Testcases may be generated by a testcase generator in accordance with parameters specified in a file that are provided by a software design specialist or engineer, otherwise the generator generates random testcases.

Verification of computer processors usually entails the definition of coverage domain(s) for use in measuring the effectiveness of various testcases and testcase generators. These domains are typically static once they are created and are persistent across the entire duration of the verification phase of development. The resulting coverage information from the testcase is collected and recorded for each entry in these domains and typically kept in a large central database as a cumulative history. These domains represent a cross-product of various components of the machine state, instructions, and instruction results. For example, where an instruction="w", addressing mode(s)="x", translation mode(s)="y", and resulting condition codes="z", the corresponding state space would equal w*x*y*z. As one might suspect, this state space can grow quite large and maintaining records for each state can be memory/compute intensive. Further, adding sequences of instructions and events to the coverage domain would expand this state space exponentially.

When using this coverage domain information in a testcase generator employing an internal coverage feedback system for generating "interesting" (e.g., unusual, rare) testcases, maintaining the smallest domain is optimal. It would also be beneficial to generate testcases based only on what has transpired in the current generation session, in addition to referencing the total cumulative coverage history. Other desirable functions include generating a comprehensive test suite, allowing user control over coverage policies, profiling initialization settings, and profiling generation tools.

SUMMARY OF THE INVENTION

The invention relates to a system and method for facilitating programmable coverage domains for test case generation, feedback, and measurement. The system comprises a domain definition input file; user-defined coverage domain data entered into the domain definition input file; and a parser operable for translating the user-defined coverage domain data into machine-readable computer program code. The system further includes an internal coverage domain comprising: a union of enabled coverage domains extracted from the user-defined coverage domain data; a session component comprising a session update count for each domain element; and a history component comprising a history update count for each domain element. The system further comprises a testcase generator including an internal coverage feedback and measurement system. The testcase generator comprises an instruction generator operable for generating instructions for use in a testcase and an instruction simulator operable for simulating execution of the instructions. The testcase generator accesses information in the internal coverage domain via the internal coverage feedback and measurement system, generates testcases for a current generation session, and updates the internal coverage domain according to the results of the testcase execution. The invention also comprises a method and storage medium.

The above-described and other features and advantages of the present invention will be appreciated and understood by those skilled in the art from the following detailed description, drawings, and appended claims.

DETAILED DESCRIPTION OF THE INVENTION

This invention allows user-defined coverage domains for enablement, disablement, and display for an internal coverage feedback mechanism for testcase generation. An internal coverage domain is provided and comprises the union of each enabled user-specified domain. This internal coverage domain is then used to guide testcase selections based on a user-defined coverage policy (e.g., uncovered, uniform distribution, user-specified distribution of selected cases, uncovered-switch-to-uniform-when covered) further based upon either the accumulated results of the current generation session and/or cumulative history of all generation sessions. The prior cumulative history is comprised of one of several external coverage reports (e.g., from other coverage collection sources) of domains that are subsets and/or supersets. These are then merged/extrapolated into the corresponding internal coverage domain element's cumulative occurrence count. The current cumulative history information is the sum of both the session and prior cumulative history information. The measurement of coverage of the newly-generated testcases is done internally and is thereafter applied to the user-specified domain. This feedback to the internal coverage state then guides subsequent decisions in future generations in the current session.

Figure 1:
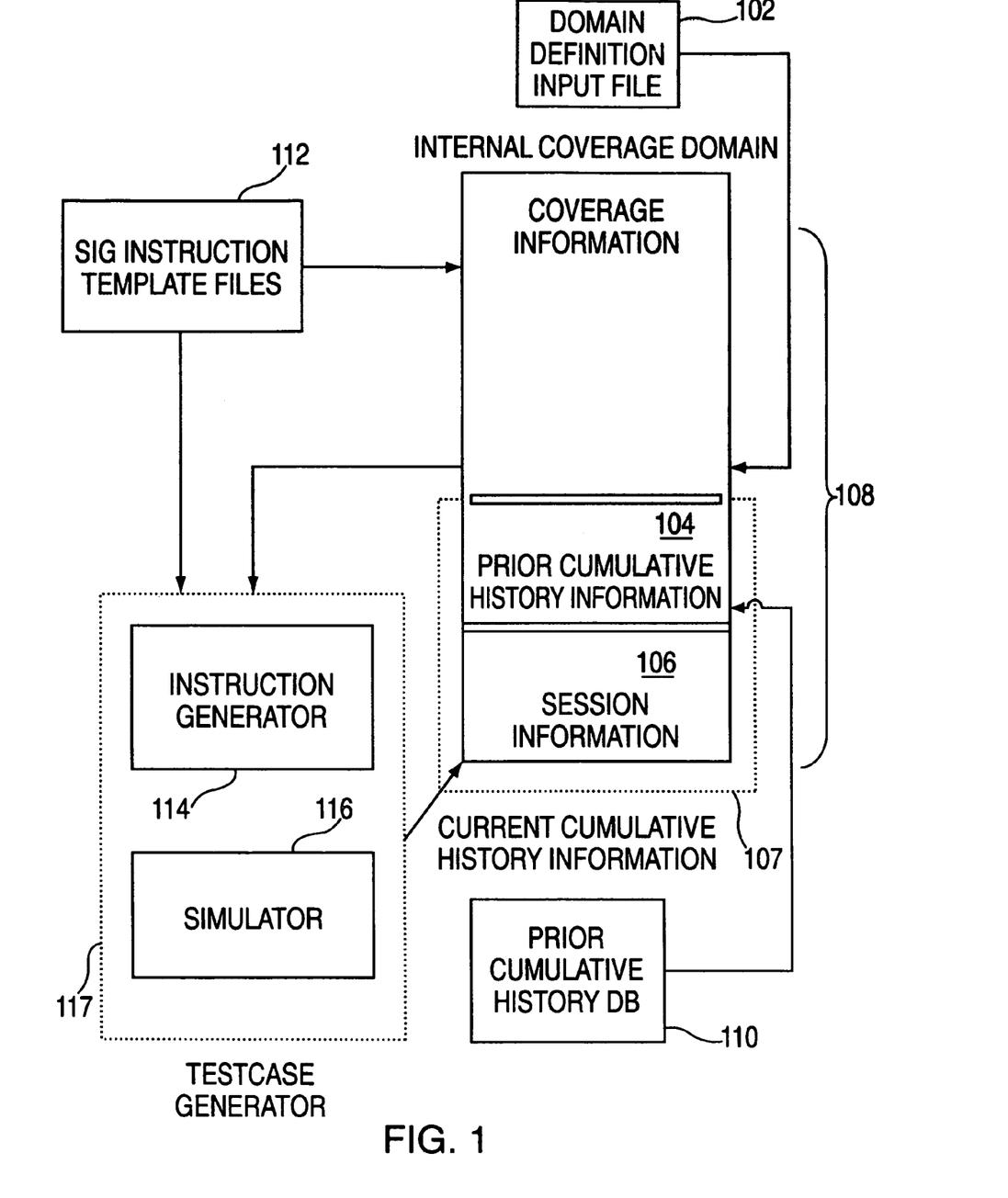
FIG. 1 is a block diagram illustrating the system components used in implementing the programmable coverage domains for a testcase generator in an exemplary embodiment.

FIG. 1 provides an overview of the elements that comprise an exemplary embodiment of the invention. A domain definition input file 102 is provided for defining the domain. An internal coverage domain 108 is constructed based upon the domain definitions. Domain definition input file 102 includes a syntax of keywords to describe the domains that are enabled, disabled, or those that reports are requested for. Each domain specified can be defined as small as one specific instance or can also encapsulate a set of elements. Internal coverage domain 108 comprises coverage information provided by domain definition input file 102 as well as information from current cumulative history component 107. Current cumulative history component 107 includes information from session component 106 and prior cumulative history component 104. Prior cumulative history information may be provided by prior cumulative history database 110.

Internal coverage domain 108 comprises a set of elements including the union of all 'enabled' user-defined domain descriptions, excluding all the 'disabled' user-defined domain descriptions. Each domain element represents one element of the cross-product of the state space. An element of the state space is composed of a sequence ($s_j$, where j=1 ... n) of architecture (a), machine level (l), addressing mode (m), translation mode (t), instruction (i) with a domain type (k) (e.g., the instruction action/result). A user-defined domain description can define from one to many domain elements of the state space. The state space of each sequence item is $s_j = a_j * l_j * m_j * t_j * i_j * k_j$, thus the entire state space would be the product of each $s_j$ from j=1 to n.

Each domain element has information for the current generation session update count and the prior cumulative history update count from optionally imported database information. These counts record the number of occurrences of the domain element encountered. Additional counts are also included for recording the current generation session's number of attempts for each domain element, the number of duplicate updates encountered during simulation of instructions in the generation, as well as the number of aborts encountered. These additional counts are used for domain/tool profiling and effectiveness and efficiency checks. These counts are further described in FIGS. 4 and 5.

User-defined coverage domains are generated using various features provided via the domain definition input file 102 as described herein. 'Verb' items specify how to handle a particular domain and include 'enable', 'disable', and 'display'. 'Enable' adds a domain to the list of valid domains. A user must provide at least one domain. 'Disable' adds a domain to the list of invalid domains. The default for this item is 'none'. 'Display' adds a domain to the list of domains that will have measurement reports. The default for this item is 'all'.

Another feature is an 'instruction identifier'. An instruction identifier may be classified as an opcode (i.e., hexadecimal representation), a 'mnemonic', a 'class', or a 'format'. Only one instruction identifier for each 'verb' may be provided by a user, though multiple elements of that identifier maybe specified. A 'mnemonic' identifier may be alphanumeric text in the case of an instruction or a meta-mnemonic for an instruction (e.g., IFETCH used for specifying instruction fetch exceptions). Since these exceptions happen during the process of instruction fetching, the instruction itself is not known. FIG. 2E illustrates multiple instructions enabled with the 'mnemonic' identifier. A 'class' identifier refers to an instruction's membership in a particular instruction class. Class identifiers can be broad-based groupings like general, control, floating point, hex floating point, binary floating point, I/O, etc., which relate directly to the chapter names of the instructions defined in "Principles of Operations" for IBM's S/390 architecture and z/architecture. Class identifiers may also be internally embedded in the programmable coverage tool (also referred to as 'tool') for creating 'interesting' instruction attributes such as "CC setting", "PSW referencing", "store type", and/or "privileged type", etc. Instructions. The term, 'interesting' refers to data that is unusual or rare, as well as a set defined by and specifically requested by a user.

A 'format' identifier refers to the instruction format type. For example, in IBM's ESAME(TM) architecture, an instruction is either one, two, or three halfwords in length and is located in storage on a halfword boundary. Each instruction is in one of 17 basic formats: E, RR, RRE, RRF, R, RXE, RXF, RS, RSE, RSI, RI, RIE, RIL, SI, S, SSE, and SS, with three variations of RRF, two of RS and RSE, and four of SS.

For example, an RR instruction format is illustrated below.

| Op Code | R1 | R2 |
|---|---|---|
| 0 | 8 | 12    15 |

An RRE instruction format is illustrated as follows.

| Op Code | ///// | R1 | R2 |
|---|---|---|---|
| 0 | 16 | 24 | 28    31 |

An RX instruction format is illustrated below.

| Op Code | R1 | X2 | B2 | D2 |
|---|---|---|---|---|
| 0 | 8 | 12 | 16 | 20    31 |

Other features provided include 'branch resolution type' (e.g., taken or not taken as applicable to branch-type instructions), 'addressing mode' (e.g., 24-bit, 31-bit, 64-bit), 'architecture mode' (e.g., ESAME(TM), S/390(TM)), 'translation mode' (e.g., real, primary, secondary, home, AR), 'level identifier' (e.g., host, guest), 'type of domain', and 'sequence identifier'. Types of domains include 'exception', 'resulting condition code', 'instruction side effects' (e.g., trace area entry), 'target addressing mode', 'cases' (e.g., defined cases for the instruction), and 'sequence' (e.g., instruction order is significant or instruction result is a 'don't care'). Exceptions refer to the type of program exception applicable for a given instruction as well as 'merged exceptions' (e.g., in IBM's S/390 and ESAME architectures there is a potential for Program-Event Recording (PER) Event. This PER event can be presented alone or concurrently with an instruction exception). A 'target addressing mode' refers to the resultant addressing mode after an instruction execution. For example, IBM's architecture has several instructions that can change the addressing mode (e.g., BSM).

Sequence identifiers are optional, and default to 'no sequence' (e.g., only one instruction in the domain element). When specified, they identify a time order of the elements in the domain. Thus, one can define a sequence of instructions with particular attributes as a single domain element (e.g., AR with CC0, followed by S with CC0, followed by CLR with CC0 which specifies a sequence of three instructions in a specific order, with specific attributes).

Figure 2A:
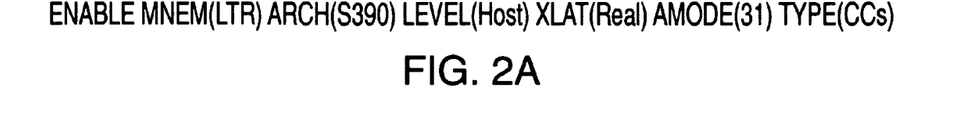
FIGS. 2A–2E illustrate a sampling of user-defined coverage domains in an exemplary embodiment.
Figure 2B:
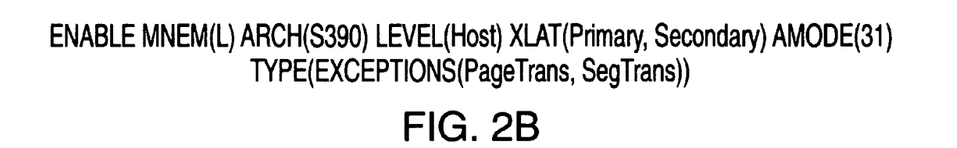
Figure 2C:
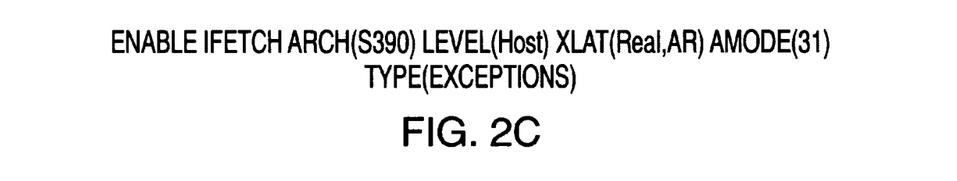
Figure 2D:
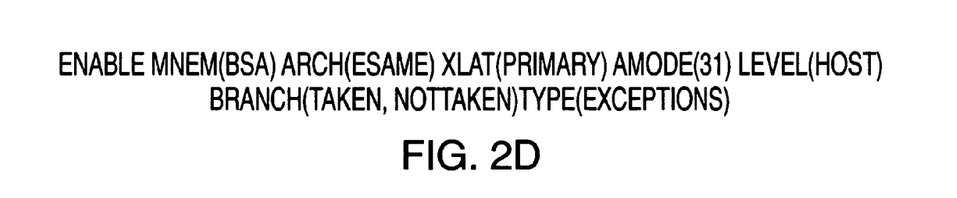
Figure 2E:
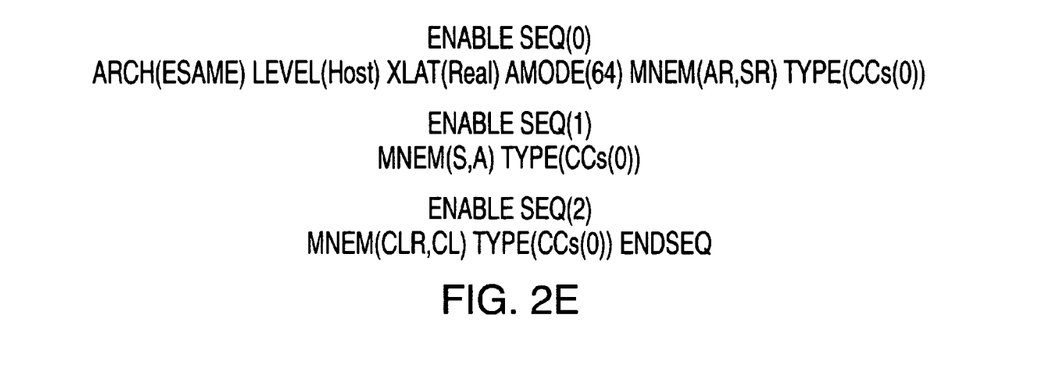

FIGS. 2A–2E illustrate sample user-defined coverage domains. FIG. 2A enables one mnemonic instruction (LTR—load and test register) and all of it's resulting condition codes in the S/390™ architecture, real translation mode, 31-bit addressing mode, at the host level.

FIG. 2B enables one instruction (L-load) and the domain-type exceptions in two groups: page translation and segment translation. Two translation modes are enabled, namely 'primary' and 'secondary'.

FIG. 2C enables the meta-mnemonic instruction, IFETCH, and all associated exceptions. Note that since the instruction fetch exceptions occur prior to decoding the instruction, the meta-mnemonic is a place holder. Two translation modes, 'real' and 'AR' are enabled.

FIG. 2D enables both paths of a branch resolution, 'taken' and 'not-taken'.

FIG. 2E enables a sequence of three instructions, all having resulting condition codes of 0. There are 8 domain elements that include three instruction sequences in this specification as shown below.

| | INSTRUCTION SEQUENCE | | |
|---|---|---|---|
| | 1 | 2 | 3 |
| DOMAIN ELEMENT 1 | AR, | S, | CLR |
| DOMAIN ELEMENT 2 | AR, | S, | CL |
| DOMAIN ELEMENT 3 | AR, | A, | CLR |
| DOMAIN ELEMENT 4 | AR, | A, | CL |
| DOMAIN ELEMENT 5 | SR, | S, | CLR |
| DOMAIN ELEMENT 6 | SR, | S, | CL |
| DOMAIN ELEMENT 7 | SR, | A, | CLR |
| DOMAIN ELEMENT 8 | SR, | A, | CL |

A parser (not shown) is provided for translating user-defined domains from their source code into machine code. The parser may be any suitable device generally known in the art. The parsed domains are then used to create an internal structure. The union of all "enabled" user-defined domains, excluding all the "disabled" user-defined domains, become the internal coverage domain 108. Instruction generator 114 and simulator 116 are internal to the testcase generator 117. Instruction generator 114 generates instructions utilizing information contained in internal coverage domain 108. Instruction simulator 116 simulates the execution of the instructions provided by instruction generator 114 for purposes of determining the results of a given instruction during the testcase generation phase and eventually in determining final results of the testcase in verifying a design. Testcase generator 117 includes a coverage feedback and measurement system for facilitating the transfer of testcase information and coverage information as described herein. Internal coverage domain 108 is utilized by testcase generator 117 in making decisions during the generation of testcases in the current generation session. A user is able to specify a domain ranging from a single element to the entire state space of the cross product as described above. This includes the capability of identifying discrete elements of the cross product, as well as the capability of identifying disjoint elements of mutually exclusive cross products (e.g., condition codes and exceptions of a particular instruction). Additionally, testcase generator's 117 internal representation of the coverage domain 108 need only maintain a small amount of information. The reduced size of internal coverage domain 108 reduces the amount of data and processing time in the coverage feedback mechanisms employed during generation. The coverage feedback mechanism employed by testcase generator 117 takes information from the internal coverage domain 108 and can resolve any meta-mnemonics in the instruction generation template by selecting an interesting instruction, optionally overriding the initial state of target machine, and setting up instruction specifics (CC, exception, etc.). Additionally, other coverage reports from cumulative history database(s) (also referred to as prior cumulative history database(s)) 110 can be used to supply information about the prior cumulative history of the defined internal coverage domains. Prior cumulative history database(s) 110 contains the collective history of interesting domains from all prior test generations. The cumulative history may be an exact match of the domain, a subset of the domain, or a superset of the domain whereby the data is extrapolated to fit the internal domains created. (e.g., a generic "access" exception attribute as a domain type can be expanded to each of it's more granular components of addressing, protection, etc.). The instructions to be generated for testing follow a user supplied template 112. Inputs to template 112 can be specific (e.g., an explicit instruction) or generic.

Features of template 112 for instruction generation include an optional 'meta-mnemonic for a coverage selected instruction', 'constraint for coverage to override initial state of the machine' (optional), and 'coverage policy'.

The optional 'meta-mnemonic for a coverage selected instruction' enables the coverage feedback system to select this particular instruction. In other words, the meta-mnemonic ID is dynamically resolved at each instruction generation cycle based on the current state of coverage domain 108. Thus, new and unique instructions can be selected to hit uncovered coverage domains using the same instruction skeleton.

'Constraint for coverage to select initial state of the machine' enables the coverage feedback system to select the initial settings of the machine (e.g., addressing mode, translation mode, architecture mode, etc.) overriding the initializations from other files. This is in order to set the same attributes of a selected interesting domain element and permits the same instruction skeleton and same initialization files to be utilized to hit uncovered domain elements in different modes. These other files describe the initializations for machine registers and machine state/mode. An initialization file consists of explicit values for bit ranges in those registers that correspond to architected control bits. Additionally, it also supports a probabilistic mode where the pairs of values and probabilities can be specified. Thus, when setting the initial state, there can be a randomly distributed selection. The constraint of 'Constraint for coverage to select initial state of the machine' enables the coverage feedback system to reselect the initial settings of the machine, thereby overriding the normal initialization process, and allowing the same initialization files to be used while hitting the various states/modes of the machine as specified by the coverage domain elements.

'Coverage policy' refers to a constraint for determining which coverage policy to utilize and includes 'uncovered', 'uniform', 'uncovered-then-switch-to-uniform', and 'user-supplied probability'. 'Uncovered' selects uncovered domain elements including 'session' (e.g., only those not yet covered in the current generation session), and 'cumulative' (e.g., only those elements not yet covered in the current generation session or any prior generation session). The 'uniform' coverage policy also includes 'session' and 'cumulative' options and selects domain elements with a uniform distribution. 'Uncovered-then-switch-to-uniform' coverage policy selects uncovered domain elements until all have been covered, then switches to uniform distribution. 'User-supplied probability' coverage policy applies a user-supplied probability for the domain element.

Figure 3:
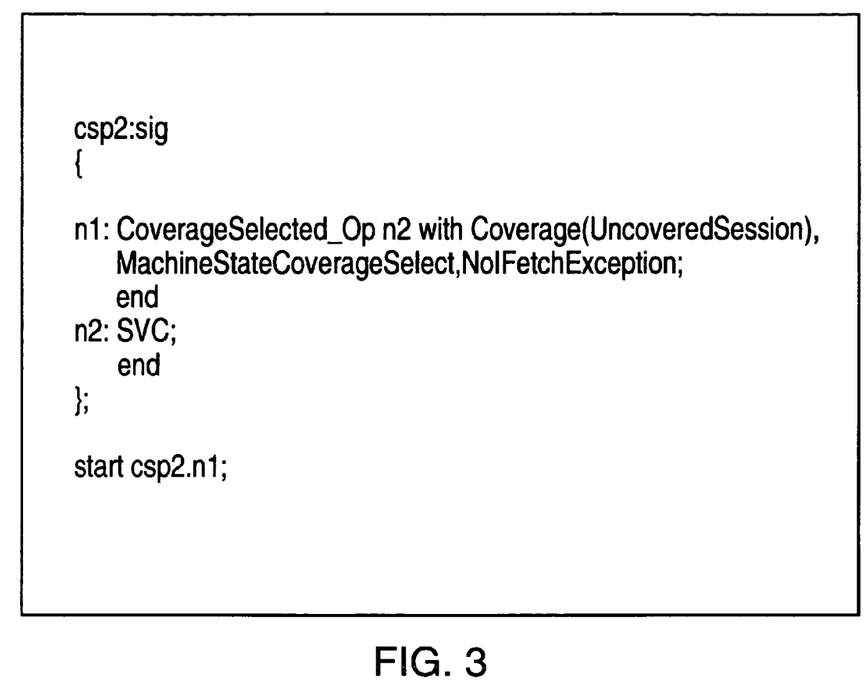
FIG. 3 is a sample instruction template illustrating user-defined inputs including a dynamic meta-mnemonic selected at generation time, a coverage policy, and machine state selection constraints.

An example of these features are represented in FIG. 3 for illustrative purposes. FIG. 3 is an instruction template, illustrating the use of a dynamic meta-mnemonic that the coverage feedback mechanism will select at each generation (e.g., CoverageSelected_Op). It also has a policy selected (e.g., Coverage(UncoveredSession)), and a constraint to allow the coverage feedback mechanism to select the initial state (e.g., MachineStateCoverageSelect). The instruction template of FIG. 3 is represented using SIGL (Symbolic Instruction Graph Language), a language introduced by IBM developed for specifying symbolic instruction graphs (SIGs) for use in generating testcases.

Figure 4:
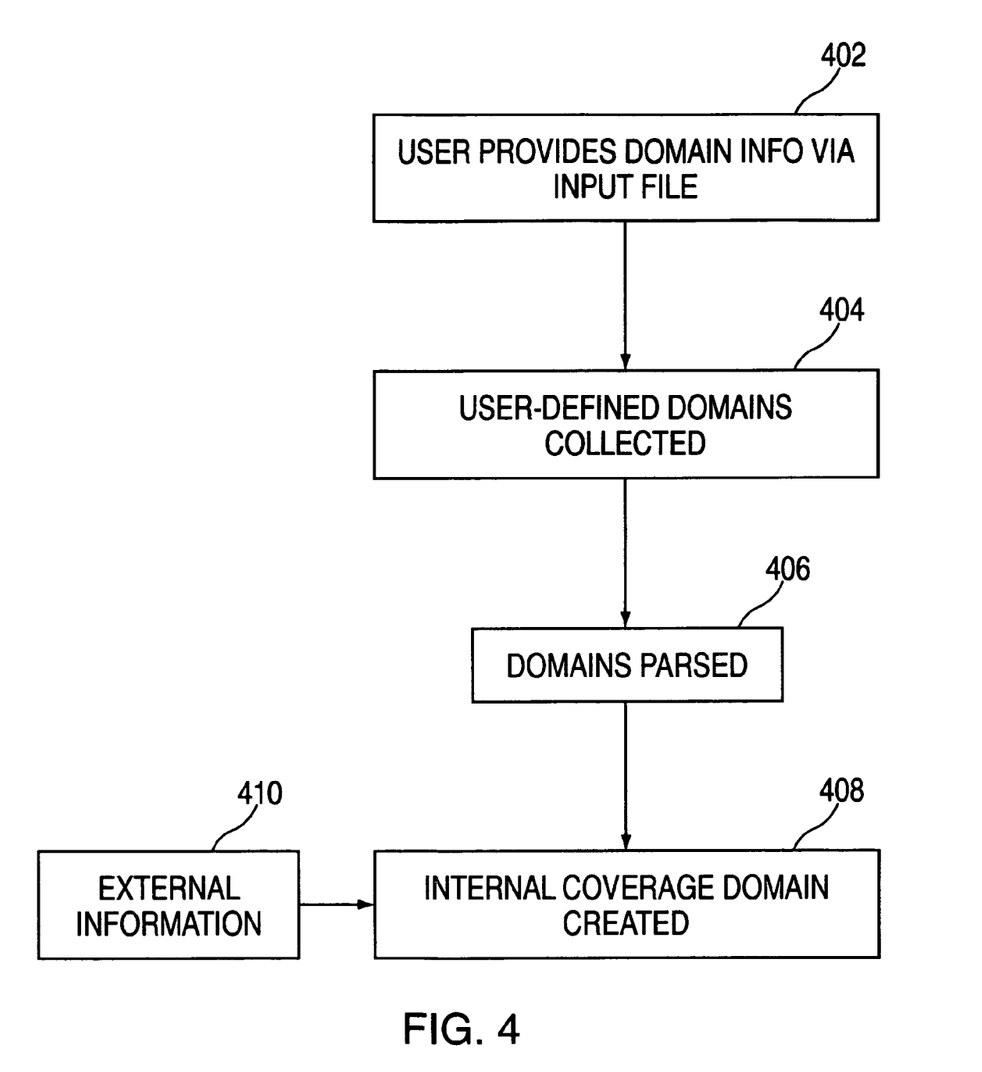
FIG. 4 is a flow chart describing the steps of creating an internal coverage domain in an exemplary embodiment.

FIG. 4 is a flow chart showing steps for establishing an internal coverage domain. A user accesses the tool at step 402 and provides domain information into domain definition input file 102. A number of user-defined domains may be provided by one or more users as desired. The tool collects this domain information as well as other user-provided domains at step 404. The information is parsed into machine-readable code at step 406. The tool checks for all the domain elements that have been enabled and not disabled via the user-defined domains and creates an internal coverage domain 108 using these enabled elements at step 408. The internal coverage domain 108 is used to generate testcases. Current coverage domain update counts are stored in session component 106. History component 104 information (e.g., information from prior cumulative history database 110) contains the prior coverage domain update counts from previous testcases generated before the current generation session. These can be accessed by the tool in order to facilitate testing and feedback to instruction generator 114 at step 410.

Figure 5:
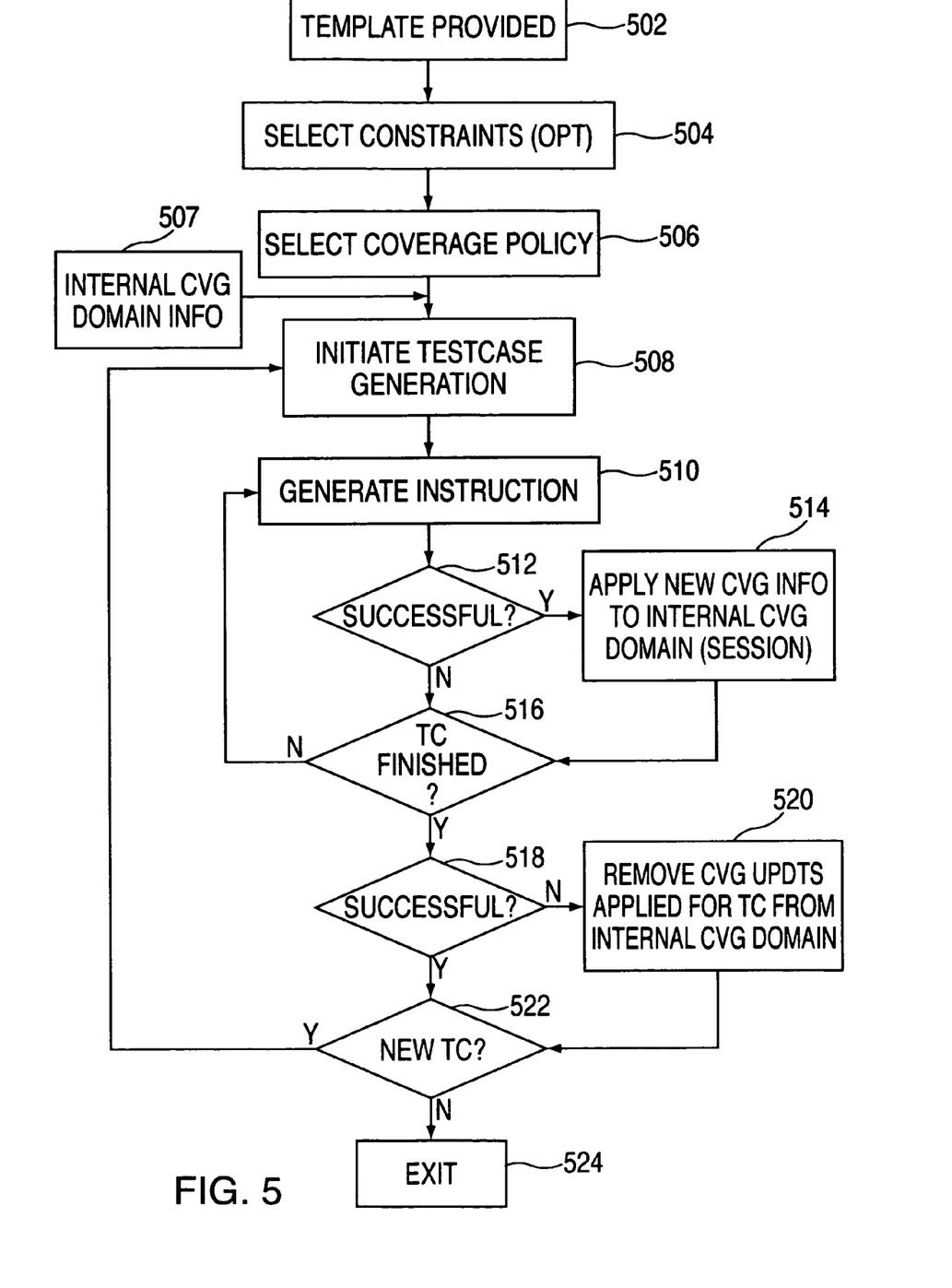
FIG. 5 is a flow chart describing the steps for defining constraints and coverage policies used in guiding instruction selection as well as for guiding subsequent decisions in future generations of a session in an exemplary embodiment.

FIG. 5 illustrates the process of defining constraints and coverage policies for guiding instruction generation. A template 112 is provided for generating instructions at step 502. The user may select from the following constraints at step 504: 'constraints for coverage to select initial state of the machine' (optional) and 'meta-mnemonic for a coverage selected instruction' (optional). Next, the user selects the desired 'coverage policy' at step 506 and as described above. Domain information from internal coverage domain 108 is provided at step 507. Testcase generator 117 implements the testcase generation utilizing information gathered from steps 504–507 at step 508. A testcase instruction is generated at step 510. If the instruction is successfully generated at step 512, the resulting coverage information is applied to internal coverage domain 108 within its session component 106 at step 514. The corresponding internal coverage domain element is updated each time it is encountered when simulating the instruction. If the instruction generation was not successful, or alternatively, once the new coverage information for a successfully generated instruction has been applied to session component 106, the tool checks to see if there is another instruction in the testcase awaiting generation at step 516. If so, testcase generator 117 generates another instruction at step 510. Steps 510–516 may be repeated until all instructions for a testcase have been generated. Once all the instructions for a testcase have been generated at step 516, the tool checks the results of the testcase at step 518. If the testcase is unsuccessful, the coverage updates applied for that testcase are removed from internal coverage domain 108 at step 520. If the testcase was successful, the tool checks to see if there is another testcase awaiting execution at step 522. If so, the process reverts to step 508 whereby the new testcase is initiated. Steps 508–522 may be repeated a number of times until all testcases have been generated. Once all testcases have been generated at step 522, testcase generator 117 exits the process at step 524. Reports can be generated after each testcase or upon completion of all the testcases as desired.

The tool allows a user to generate a comprehensive test suite including a collection of testcases to profile a new instruction and/or architected environment or result. This set may include an example of each possible domain element in the user-defined domain. The tool also provides user control over coverage policy including biasing certain generation cases with specific probabilities, having uniform distribution on the specific domain, and generating testcases that hit uncovered domain elements. This applies to both the current generation session and/or to all the cumulative generation sessions to date. It also allows the user to switch to a uniform distribution coverage policy once all domain elements are covered.

The tool also allows for profiling of initialization settings including measuring and validating the user initialization settings to insure they enable reaching all elements of a specified domain. Further the tool enables a user to profile a generation tool including measuring and validating the effectiveness and efficiency of the generation tool itself in covering a specified domain. This insures that all domain elements can be generated and determines efficiency in the generation (e.g., checking to see if there are any inordinate amount of aborts, etc.).

The description applying the above embodiments is merely illustrative. As described above, embodiments in the form of computer-implemented processes and apparatuses for practicing those processes may be included. Also included may be embodiments in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Also included may be embodiments in the form of computer program code, for example, whether stored in a storage medium, loaded into and/or executed by a computer, or as a data signal transmitted, whether a modulated carrier wave or not, over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

The invention claimed is:

1. A system for facilitating programmable coverage domains, comprising:
   a domain definition input file;
   user-defined coverage domain data entered into said domain definition input file;
   a parser operable for translating said user-defined coverage domain data into machine-readable computer program code;
   an internal coverage domain comprising:
      a union of enabled coverage domains extracted from said user-defined coverage domain data;
      a session component comprising a session update count for each domain element; and
      a history component comprising a history update count for each domain element; and
   a testcase generator including an internal coverage feedback and measurement system, said testcase generator comprising:
      an instruction generator operable for generating instructions for use in a testcase; and
      an instruction simulator operable for simulating execution of said instructions;
         wherein said testcase generator accesses information in said internal coverage domain via said internal coverage feedback and measurement system, said internal coverage domain guiding testcase selections and updating said internal coverage domain according to results of testcase executions.

2. The system of claim 1, further comprising an instruction template including features operable for specifying instructions for generation;
   wherein said features comprise:
      a meta-mnemonic operable for specifying a coverage selected instruction;
      a constraint operable for specifying a coverage to select initial state of machine; and
      a coverage policy.

3. The system of claim 2, wherein said meta-mnemomc for a coverage selected instruction causes said coverage feedback system to select a next instruction, wherein a meta-mnemonic ID is dynamically resolved at each generation cycle based on a current state of said internal coverage domain.

4. The system of claim 2, wherein said constraint for coverage to select initial state of machine causes said coverage feedback system to select initial settings of machine in order to set same attributes of a selected domain element operable for huffing uncovered domain elements in different modes.

5. The system of claim 2, wherein said coverage policy refers to a constraint for determining which coverage policy to utilize and includes:
   uncovered operable for selecting uncovered domain elements including:
      session; and
      cumulative;
   uniform operable for selecting domain elements with a uniform distribution including:
      session; and
      cumulative;
   uncovered-then-switch-to-uniform operable for selecting uncovered domain elements until all have been covered, then switches to uniform distribution; and
   user supplied probability operable for applying a user-supplied probability for a domain element.

6. The system of claim 1, wherein said user-defined coverage domain data is entered via features provided by the domain definition input file, said features including:
   a verb item operable for specifying a manner of handling a domain, said verb item comprising at least one of:
      enable;
      disable; and
      display;
   an instruction identifier;
   a branch resolution type;
   an addressing mode;
   an architecture mode;
   a translation mode;
   a level identifier mode;
   a type of domain; and
   a sequence identifier.

7. The system of claim 6, wherein: enable causes an associated coverage domain to be added to a list of valid coverage domains;
   disable causes an associated coverage domain to be added to a list of invalid coverage domains; and
   display causes an associated coverage domain to be added to a list of coverage domains requiring measurement reports.

8. The system of claim 6, wherein said instruction identifier comprises classifications including:
   an opcode classification operable for specifying a hexadecimal representation;
   a mnemonic classification operable for specifying at least one of an alphanumeric representation and a meta-mnemonic representation;
   a class field operable for specifying an instruction's membership in an instruction class, said instruction class specified as at least one of:
      a general;
      a control;
      a floating point;
      a hex floating point;
      a binary floating point;
      an input/output value;
      a CC setting;
      a PSW reference;
      a store type; and
      a privileged type; and
   a format classification operable for specifying an instruction format type.

9. The system of claim 6, wherein:
   said branch resolution type enables a user to specify branch conditions applicable to branch instructions;

said translation mode enables a user to specify at least one of:
  a real;
  a primary;
  a secondary;
  a home; and
  an access register;
said level identifier mode enables a user to specify at least one of:
  a host; and
  a guest;
said type of domain enables a user to specify at least one of:
  an exception;
  a resulting condition code; and
  an instruction side effect including trace area entry, target addressing mode, cases, and sequence; and
said sequence identifier enables a user to specify one of:
  an instruction sequence; and
  no sequence wherein a time order of elements in the domain is identified.

10. The system of claim 1, wherein said session update count records a number of successful occurrences of said each domain element for a current generation session.

11. The system of claim 1, wherein said history update count records a number of successful occurrences of said each domain element from user-selected testcases executed in at least one prior generation session.

12. The system of claim 1, further comprising a prior cumulative history database operable for storing a collective history of specified domain data from previously-generated testcases.

13. A method for facilitating programmable coverage domains, comprising:
  entering user-defined coverage domain data by at least one user into a domain definition input file;
  translating said user-defined coverage domain data into machine-readable computer program code; and
  creating an internal coverage domain comprising:
    a union of enabled coverage domains extracted from said user-defined coverage domain data;
    a session update count for each domain element; and
    a history update count for each domain element;
  wherein a testcase generator generates instructions for use in a testcase and a simulator simulates execution of the instructions; and wherein further, the testcase generator accesses information in said internal coverage domain, said internal coverage domain guiding testcase selections and updating said internal coverage domain according to results of the testcase executions.

14. The method of claim 13, further comprising:
specifying at least one instruction for generation via features provided by an instruction template, said features comprising:
  a meta-mnemonic operable for specifying a coverage selected instruction;
  a constraint operable for specifying a coverage to select initial state of machine; and
  a coverage policy.

15. The method of claim 14, wherein said meta-mnemonic for a coverage selected instruction causes a coverage feedback system to select a next instruction, and wherein further, a meta-mnemonic ID is dynamically resolved at each generation cycle based on a current state of said internal coverage domain.

16. The method of claim 14, wherein said constraint for coverage to select initial state of machine causes a coverage feedback system to select initial settings of machine in order to set same attributes of a selected domain element operable for hitting uncovered domain elements in different modes.

17. The method of claim 14, wherein said coverage policy refers to a constraint for determining which coverage policy to utilize and includes:
  uncovered operable for selecting uncovered domain elements including:
    session; and
    cumulative;
  uniform operable for selecting domain elements with a uniform distribution including:
    session; and
    cumulative;
  uncovered-then-switch-to-uniform operable for selecting uncovered domain elements until all have been covered, then switches to uniform distribution; and
  user supplied probability operable for applying a user-supplied probability for a domain element.

18. The method of claim 13, wherein entering said user-defined coverage domain data includes specifying:
  a verb item operable for specifying a manner of handling a domain, said verb item comprising at least one of:
    enable;
    disable; and
    display;
  an instruction identifier;
  a branch resolution type;
  an addressing mode;
  an architecture mode;
  a translation mode;
  a level identifier mode;
  a type of domain; and
  a sequence identifier.

19. A storage medium encoded with machine-readable computer program code for facilitating programmable coverage domains, the storage medium including instructions for causing a computer to implement a method comprising:
  entering user-defined coverage domain data by at least one user into a domain definition input file;
  translating said user-defined coverage domain data into machine-readable computer program code; and
  creating an internal coverage domain comprising:
  a union of enabled coverage domains extracted from said user-defined coverage domain data;
  a session update count for each domain element; and
  a history update count for each domain element;
  wherein a testcase generator generates instructions for use in a testcase and a simulator simulates execution of the instructions; and wherein further, the testcase generator accesses information in said internal coverage domain, said internal coverage domain guiding testcase selections and updating said internal coverage domain according to results of the testcase executions.

20. The storage medium of claim 19, further comprising instructions for causing said computer to implement:
  specifying at least one instruction for generation via features provided by an instruction template, said features comprising:
    a meta-mnemonic operable for specifying a coverage selected instruction;
    a constraint operable for specifying a coverage to select initial state of machine; and
    a coverage policy.

21. The storage medium of claim 20, wherein said meta-mnemonic for a coverage selected instruction causes a coverage feedback system to select a next instruction, and wherein farther, a meta-mnemomc ID is dynamically resolved at each generation cycle based on a current state of said internal coverage domain.

22. The storage medium of claim 20, wherein said constraint for coverage to select initial state of machine causes a coverage feedback system to select initial settings of machine in order to set same attributes of a selected domain element operable for hitting uncovered domain elements in different modes.

23. The storage medium of claim 20, wherein said coverage policy refers to a constraint for determining which coverage policy to utilize and includes:
uncovered operable for selecting uncovered domain elements including:
session; and
cumulative;
uniform operable for selecting domain elements with a uniform distribution including:
session; and
cumulative;
uncovered-then-switch-to-uniform operable for selecting uncovered domain elements until all have been covered, then switches to uniform distribution; and
user supplied probability operable for applying a user-supplied probability for a domain element.

24. The storage medium of claim 19, wherein entering said user-defined coverage domain data includes specifying:
a verb item operable for specifying a manner of handling a domain, said verb item comprising at least one of:
enable;
disable; and
display;
an instruction identifier;
a branch resolution type;
an addressing mode;
an architecture mode;
a translation mode;
a level identifier mode;
a type of domain; and
a sequence identifier.

* * * * *